United States Patent Office 2,724,293
Patented Nov. 22, 1955

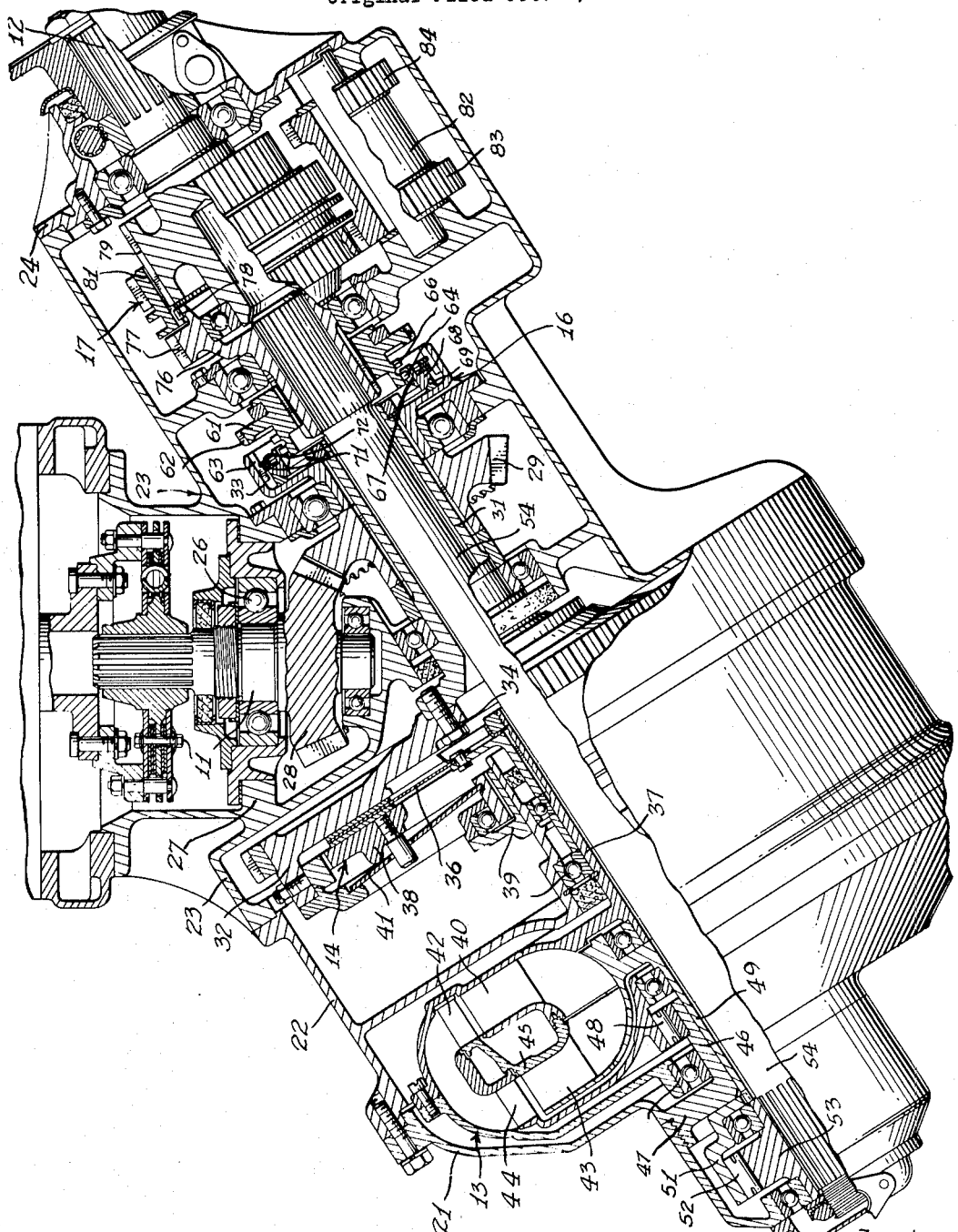

2,724,293

HYDRAULIC TORQUE CONVERTER

Helmuth Guentsche and Laurence A. Nelson, Pontiac, and Hans O. Schjolin, Birmingham, Mich., assignors to General Motors Corporation, Detroit, Mich., a corporation of Delaware Original application October 8, 1947, Serial No. 778,612, now Patent No. 2,694,950, dated November 23, 1954. Divided and this application February 15, 1954, Serial No. 415,858

8 Claims. (Cl. 74—732)

The present invention relates to an improved type angle drive transmission which broadly includes means for providing drive from an engine to an output shaft either directly or through a fluid torque converter.

The invention is directed to an improvement in the structural relationship and organization of the components which make the aforementioned drive alternatives possible. More specifically, the present invention proposes a unique arrangement of transmission components with respect to the engine output shaft.

The present invention was divided from Patent 2,694,950, filed October 8, 1947, and is companion to applicants' co-pending application S. N. 415,857 Guentsche et al.

It is proposed in the present invention to provide an angle drive transmission which includes a fluid torque converter and a pair of clutches adapted to variously connect the input and output sides of said converter with the power transmission mechanism all disposed on one side of the engine centerline and a direct drive clutch and gear ratio changing unit disposed on the opposite side of said centerline with respect to said torque converter and associated clutches.

The present invention provides a compact angle drive transmission of simple construction which may be easily assembled and serviced. The advantages of the instant invention will be more readily perceived from a perusal of the detailed description which follows.

The drawing represents a sectional plan view of the preferred embodiment of the subject invention.

Referring to the drawing, an engine or power input shaft is shown at 11 and a transmission output or load shaft at 12. The power transmission device, which is inclined obliquely to the center-line of the engine or engine shaft 11, is disposed intermediate the engine shaft and the output shaft 12. The power transmission device includes a torque converter 13 and a clutch 14 for connecting the torque converter to the engine shaft. Converter 13 and clutch 14 are disposed on one side of the engine center-line while a direct drive clutch 16 and a gear ratio changing unit 17 are disposed on the opposite side of said center-line.

The aforesaid members are so constructed and arranged as to permit the power output from said engine shaft to flow through said torque converter to provide torque multiplication for said output shaft or to permit the power to flow directly from said engine shaft to said output shaft at a one to one speed ratio. The various components of the power transmission mechanism will be sequentially considered in the normal order of power flow.

The power transmission mechanism is housed in a fabricated casing which, referring to the drawing from left to right, includes casing members 21, 22, 23 and 24. The various transmission casing members are suitably bolted or otherwise fastened together in any convenient manner to provide a unitary casing. The transmission is joined to the engine through casing member 23.

The engine output shaft or transmission input shaft 11 is supported at one end by a bearing member 26 mounted in casing web 27. A bevel gear member 28 is mounted on shaft 11 and cooperates with a corresponding bevel gear member 29 splined to an intermediate shaft 31 coaxially disposed with respect to output shaft 12. Intermediate shaft 31 is operatively connected to and adapted to drive the input members 32 and 33, respectively, of torque converter clutch 14 and direct drive clutch 16.

Torque converter clutch input member 32 is bolted at 34 to intermediate shaft 31. The clutch includes an output member 36 connected to a converter input shaft 37. A clutch member 38 is adapted to be snap actuated by a collar 39 and a spring 41 to engage or release the clutch 14. When clutch 14 is applied, output member 36 is frictionally engaged between members 32 and 36 to drive converter input shaft 37.

The torque converter 13 includes an impeller member 40, a split turbine member 45 having a first blade stage 42 and a second blade stage 43, and a reaction member 44 disposed intermediate the first and second turbine stages. Impeller member 40 is integrally formed with or connected to shaft 37 for rotation therewith. The reaction member 44 is connected to a sleeve 46 of casing web 47 through a one-way brake 48. Brake 48 restrains the reaction member 44 against reverse rotation when the torque converter is in its torque multiplying condition, but permits the stator to free-wheel in the direction of impeller and turbine rotation as torque multiplication is reduced.

Turbine member 45 is integrally connected to a coaxially disposed converter output shaft 49 which has spline-connected at one end the input member 51 of a one-way clutch 52. The inner or output member 53 of one-way clutch 52 is connected to an intermediate output shaft 54. One-way clutch 52 is constructed and arranged to positively connect the torque converter output shaft 49 with the intermediate output shaft 54 when the speed of the former exceeds the speed of the latter. Likewise, clutch 52 permits the intermediate output shaft 54 to overrun with respect to the torque converter output shaft 49 when the speed of the former exceeds that of the latter. In this way clutch 52 prevents power being lost in reversely driving the torque converter when drive is through the direct drive clutch 16 which would otherwise feed power back to the converter through intermediate shaft 54.

As previously noted, intermediate shaft 31 is also connected to and drives the input member 33 of the direct drive jaw clutch 16. A slider gear 61 internally splined to intermediate shaft 54 is adapted to engage through teeth 62 internal teeth 63 formed on the input member 33 and to thereby transmit power directly from the engine shaft 11 to the intermediate output shaft 54. To facilitate the engagement of the input member 33 and slider gear 61 of the direct drive clutch, a synchronizing mechanism is provided. The synchronizing mechanism includes toothed portions 64 and 66 formed on slider gear 61. The teeth 64 are adapted to mesh with internal teeth 67 of a friction ring 68 having an inclined friction face coacting with an adjacent friction face on a ring 69. Ring 69 is fixed to input member 61. A pre-load spring 71 retained by a lock ring 72 disposed in the input member 61 exerts a light axial force on the friction ring 68 for engaging it in driving relation with ring 69. The teeth 64 and 66 on slider gear 61 are spaced to provide a balking action under attempted meshing of the teeth 62 of the slider gear with teeth 63 of the input member until the slider gear 61 and the input member 33 are at substantially synchronous speeds.

This general type of constant pre-load balk ring is explained in full in Letters Patent No. 2,420,914, issued May 20, 1947, to H. O. Schjolin for improvements in "Converter Construction and Control."

Intermediate output shaft 54 is adapted to be coupled directly to the output shaft 12 through the gear unit 17. An externally toothed gear member 76 is mounted on the intermediate output shaft. In addition to teeth 77, gear member 76 has also formed thereon a smaller set of external teeth 78. Output shaft 12 has an externally splined member 79 formed thereon which supports a sliding bridging gear member 81. Sliding gear member 81 is adapted to slidably engage teeth 78 of gear member 76 to provide forward drive for the output shaft 12, as shown in the drawing.

In order to provide for reverse rotation of the output shaft, a reversing mechanism is provided in the gear unit. The reversing mechanism includes a countershaft member 82 having gears 83 and 84 disposed at either end thereof, and a reverse idler gear, not shown, constantly meshing with gear members 76 and 83. To obtain reverse rotation of the output shaft, the slider gear member 81 is moved axially to the right out of engagement with teeth 78 on gear member 76 and into external engagement with countershaft gear member 84. In this way the drive from the intermediate output shaft 54 is reversed through the reverse idler gear with the reverse drive being transmitted through the countershaft to the gear member 81 and thence to the output shaft 12.

With the mechanism as thus far described it is now possible to consider the various drive arrangements that may be achieved with the subject transmission. The drive arrangements will be considered as they normally occur in starting a vehicle from a stopped position and proceeding to an underway position. Thus, with the vehicle at rest, the direct drive clutch 16 is operatively disconnected from the intermediate output shaft 54. Torque converter clutch 14 is applied and drive proceeds through the torque converter and the overrunning clutch 52 to the intermediate output shaft 54 and thence through the gear unit 17 which is conditioned for forward drive, as described above. Thereafter when the vehicle achieves sufficient speed so as to no longer require the torque multiplication of torque converter 13, the direct drive clutch 16 is applied, and the torque converter clutch 14 is disconnected, in which case the drive from the engine output shaft 11 proceeds directly through direct drive clutch gear unit 17 to the output shaft 12.

In the event reverse drive is desired, the direct drive clutch 16 is disconnected and the torque converter clutch 14 applied, as in starting in forward drive, to provide a high torque output to the intermediate shaft 54, the gear unit is shifted to its reverse condition, in which the output shaft 12 is reversely rotated, as described above.

It is apparent in the subject device that through the torque converter clutch 14 and overrunning clutch 52 it is possible to eliminate any drive to the fluid torque converter when the transmission is conditioned for direct drive and in this way the power losses in idling or spinning the torque converter are avoided.

Suitable roller bearings are mounted throughout the transmission casing members to provide adequate rotative support for the various coaxial shafts within the transmission.

The transition or shift from torque converter drive to direct drive may be either manually or automatically controlled. While in the present device it is contemplated that the control would be automatic, these controls do not form a part of the present invention and, therefore are not particularly shown or described. The shift from forward to reverse drive, as is usual even in automatic transmissions, would be manually achieved.

We claim:

1. In power transmissions, a driving shaft, a driven shaft, a casing, a fluid torque converter in said casing having an input member, the rotative axis of said torque converter being inclined to the rotative axis of said driving shaft, an output member and a rotatable reaction member, bladed elements included in said members, a friction clutch for connecting said input member with said driving shaft, control mechanism for said friction clutch, a clutch for connecting said output member with said driven shaft when said input member is over-taking, a jaw clutch device adapted to couple said shafts, said device including means for connecting said shafts only at synchronous speeds, and controls for said friction clutch mechanism and jaw clutch device operative to establish drive by said converter of said driven shaft or to establish direct drive between said shafts.

2. In power transmission assemblies, a first hollow shaft provided with an input driving gear, a ring of clutch teeth formed on an extension of said shaft, a second shaft extending within said first shaft and adapted to be coupled to power and to load connections at points beyond the axial length of said first shaft, a third shaft arranged to be connected to a load, said third shaft being included in the construction of a step-ratio gear unit adapted to couple the third shaft to the second shaft, a reduction gear train embodied in said unit, a gearbody splined to said second named shaft having a ring of teeth operative to drive said third shaft through the agency of said gear train, said gearbody being externally splined for mounting a slider member which is formed with external jaw clutch teeth, a slider member splined on said third shaft having a ring of teeth mating with said ring of teeth formed on the adjacent face of said gearbody for direct drive connection thereof, a synchronism responsive device operative to permit engagement of said rings of clutch teeth at unit speed only, variable speed driving mechanism connecting said first and second shafts for drive over a reduction speed range approaching one to one ratio, said mechanism having a disengageable driving friction clutch and a second clutch for releasing the drive of said mechanism to said second shaft, and controls for said friction clutch and for said device operative to alternate the drive of said second shaft by said first shaft by connecting and disconnecting said friction clutch and said device alternately.

3. In power transmission drive mechanisms, an engine-connected shaft, a coplanar variable ratio driving assembly driven by said shaft and arranged to drive a driving shaft, a transfer gear group coupling said engine shaft and said assembly at an oblique angle, having a driving gear fixed to said driving shaft, the arrangement requiring intersection of the centerlines of said first shaft and said assembly, a longitudinal arrangement of said assembly embodying a fluid torque converter, a fluid torque converter driving clutch, the driving shaft being driven by said transfer gear group adjacent said intersection, a direct drive jaw clutch adapted to couple said driving and driven shafts, and a step-ratio gear unit arranged to deliver power from said driven shaft to a load shaft; input, output and reaction members for said converter, the input member being connected to said driving clutch, a one-way clutch effective to provide overtaking drive of said driven shaft by said output member, a second one-way brake arranged to prevent backward rotation of said reaction member and control means for said driving clutch and for said jaw clutch, effective to connect the power of said first shaft to said driven shaft at variable ratio speed ranges approaching one to one ratio and to couple same at synchronous speeds at one to one ratio.

4. In the combination set forth in claim 3, the subcombination of an engine shaft, and of a vibration-damping device coupling the engine shaft to said first-named shaft.

5. In a power transmission mechanism, a driving shaft, a driven shaft, the respective axes of said shafts being disposed at an oblique angle to each other, a fluid torque converter having input and output members, a first coupling means for connecting said input member with said driving shaft, control mechanism for said coupling means, means for connecting said output member with said driven shaft when the speed of said output member tends to exceed the speed of said shaft, a second coupling means adapted to directly couple said shafts, said second means including a device for connecting said shafts only at synchronous speeds, and control means for said first and second coupling means operative to alternatively provide drive either directly between said driving and driven shafts or to provide drive between said shafts indirectly through said torque converter.

6. In a power transmission mechanism, a driving shaft, a driven shaft, the respective axes of said shafts being disposed at an oblique angle to each other, a fluid torque converter having input and output members, a first coupling means for connecting said input member with said driving shaft, control mechanism for said coupling means, means for connecting said output member with said driven shaft when the speed of said output member tends to exceed the speed of said shaft, a second coupling means adapted to directly couple said shafts, said second means including a device for connecting said shafts only at synchronous speeds, and control means for said first and second coupling means operative to alternately provide drive either directly between said driving and driven shafts or to provide drive between said shafts indirectly through said torque converter, a load shaft, a change speed gear unit intermediate said driven shaft and said load shaft, and control means for said gear unit adapted to vary the drive between said driven and load shafts.

7. In a drive transmitting mechanism consisting of a power plant having a driving shaft, a driven shaft, a fluid torque converter having input and output members, the rotative axis of said torque converter and said driven shaft being obliquely inclined to the rotative axis of said driving shaft, a first clutch device adapted to connect said input member with said driving shaft, control mechanism for said first clutch, an overrunning clutch for connecting said output member with said driven shaft when the speed of said output shaft member tends to exceed the speed of said shaft, a second clutch device adapted to directly couple said shafts, said second clutch device including means for connecting said shafts only at synchronous speeds, and control means for said first and second clutch devices operative to alternatively provide drive either directly between said driving and driven shafts or to provide drive between said shafts indirectly through said torque converter.

8. In a drive transmitting mechanism consisting of a power plant having a driving shaft, a driven shaft, the respective center lines of said shafts being disposed at an oblique angle to each other, a fluid torque converter having input and output members, a friction clutch device for connecting said input member with said driving shaft, control mechanism for said friction clutch, an overrunning clutch for connecting said output member with said driven shaft when the speed of said output member tends to exceed the speed of said shaft, a jaw clutch device adapted to directly couple said shafts, said jaw clutch device including a synchronizing device for connecting said shafts only at synchronous speeds, a load shaft, a forward-reverse gear unit intermediate said driven shaft and said load shaft and control means for said gear unit adapted to select forward or reverse drive for said load shaft, said jaw clutch and gear unit being disposed together on one side of the intersection of said center lines.

References Cited in the file of this patent
UNITED STATES PATENTS

| | | |
|---|---|---|
| 2,009,133 | Gerst | July 23, 1935 |
| 2,250,656 | Schjolin | July 29, 1941 |
| 2,325,876 | Pollard | Aug. 3, 1943 |
| 2,376,699 | Jandasek | May 22, 1945 |
| 2,397,634 | Voytech | Apr. 2, 1946 |
| 2,403,954 | Schjolin | July 16, 1946 |
| 2,435,930 | Schjolin | Feb. 10, 1948 |
| 2,459,093 | Peterson et al. | Jan. 11, 1949 |
| 2,594,811 | Schjolin | Apr. 29, 1952 |